(12) United States Patent
Ohyama

(10) Patent No.: US 8,050,167 B2
(45) Date of Patent: Nov. 1, 2011

(54) OPTICAL DEVICE

(75) Inventor: Minoru Ohyama, Yokohama (JP)

(73) Assignee: Victor Company of Japan, Limited, Yokohama-Shi, Kanagawa (JP)

( * ) Notice: Subject to any disclaimer, the term of this patent is extended or adjusted under 35 U.S.C. 154(b) by 5 days.

(21) Appl. No.: 12/659,214

(22) Filed: Mar. 1, 2010

(65) Prior Publication Data

US 2010/0229189 A1     Sep. 9, 2010

(30) Foreign Application Priority Data

Mar. 4, 2009 (JP) ................................. 2009-051396
Sep. 11, 2009 (JP) ................................. 2009-210112
Sep. 11, 2009 (JP) ................................. 2009-210120

(51) Int. Cl.
*G11B 7/00* (2006.01)

(52) U.S. Cl. ................. 369/112.01; 369/44.12; 369/121

(58) Field of Classification Search ............. 369/44.12, 369/121, 112.01, 112.27
See application file for complete search history.

(56) References Cited

U.S. PATENT DOCUMENTS

| | | | |
|---|---|---|---|
| 5,742,315 A * | 4/1998 | Szlucha et al. ............. | 347/102 |
| 6,542,315 B2 * | 4/2003 | Shindo ........................ | 369/112.01 |
| 6,778,486 B1 * | 8/2004 | Arikawa et al. ............. | 369/44.12 |
| 2002/0008888 A1 * | 1/2002 | Ohyama ...................... | 369/103 |
| 2002/0093893 A1 * | 7/2002 | Matsuda ...................... | 369/121 |
| 2003/0063552 A1 * | 4/2003 | Uchizaki ...................... | 369/121 |
| 2003/0098405 A1 * | 5/2003 | Yamamoto et al. .......... | 250/200 |
| 2005/0237871 A1 * | 10/2005 | Lee .............................. | 369/44.14 |

FOREIGN PATENT DOCUMENTS

| JP | 2000-196176 A | 7/2000 |
|---|---|---|
| JP | 2005-56480 A | 3/2005 |

* cited by examiner

*Primary Examiner* — Thang Tran
(74) *Attorney, Agent, or Firm* — The Nath Law Group; Jerald L. Meyer; Stanley N. Protigal

(57) ABSTRACT

An optical device includes a sub-mount 2 mounting first and second semiconductor lasers 1a, 1b and having an onboard part for the semiconductor lasers and an optical-path conversion mirror 7 integrated with each other, and a light receiving element 11 arranged on a light receiving element substrate to have first and second light receiving regions separated from each other by at least one parting line. In the optical device, one light gravity center of an optical spot, which is formed on the light receiving element 11 by homeward flux of light emitted from the first semiconductor laser 1a and reflected by an optical disc 55, and another light gravity center of an optical spot, which is formed on the light receiving element 11 by homeward flux of light emitted from the second semiconductor laser 1b and reflected by the optical disc 55 are together positioned on the parting line.

3 Claims, 7 Drawing Sheets

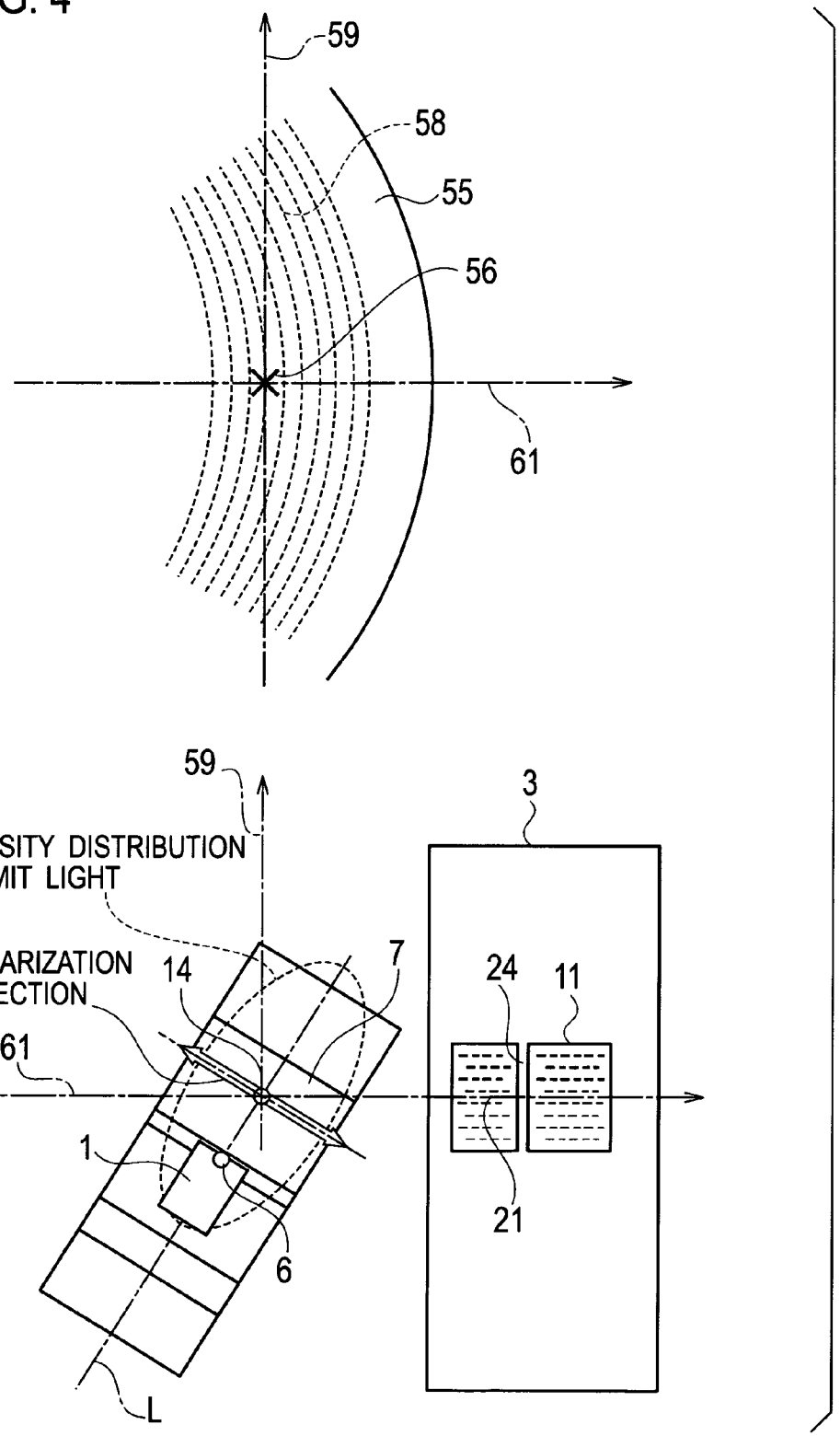

OPTICAL DEVICE

BACKGROUND OF THE INVENTION

1. Field of the Invention

The present invention relates to an optical device used in an optical pickup for recording and/or reproducing information against optical information recording media, such as optical discs.

2. Description of the Related Arts

In the optical discs as information recording media, conventionally, there are known CD (Compact Disc), DVD (Digital Versatile Disc), BD" (Blu-ray Disc) for high density recording and so on. These optical discs are being required with large capacity and high density. With such requirements, it is contemplated that the optical pickup for reproducing and/or recording information from and to these optical discs is provided with a light source of short-wavelength and an improved numerical aperture of an objective lens. In addition, light receiving/emitting elements and optical components constituting an optical pickup are also required to have dimensions and mutual positional relationships of high accuracy.

With a wide variety of applications of optical discs, a recording/reproducing device is also required with improved portability and therefore, the optical pickup is required to satisfy not only high reliability but miniaturization and weight saving. Coping with these requirements, there is provided an optical device that includes, as constituents, a semiconductor laser (or laser unit) forming a light source of the optical pickup, a PDIC (Photo Detector IC) forming a substrate for a light receiving element, a hologram element having optical-path converting and optical-path dividing functions and also lens function and a mirror, all of which are collected to one body for integration. Also in this optical device, with the provision of an optical disc with large capacity and high density, respective components forming the optical pickup are also required to have dimensions and mutual positional relationships of high accuracy and also price-reduction.

In Japanese Patent Publication Laid-open No. 2005-056480, there is proposed an optical device where an optical-path conversion mirror, a sub-mount and a semiconductor laser are mounted in separated components on a PDIC, while the semiconductor laser is united with a light receiving element for integration.

In addition, in Japanese Patent Publication Laid-open No. 2000-196176, there is disclosed an optical device where a light receiving element substrate, an optical-path conversion mirror and a sub-mount are united with each other, while a semiconductor laser is mounted on a PDIC through the intermediary of no sub-mount.

SUMMARY OF THE INVENTION

In the optical device disclosed in Japanese Patent Publication Laid-open No. 2000-196176, the optical-path conversion mirror is manufactured by means of etching a semiconductor substrate.

In this optical device, a light receiving element is manufactured in the form of the PDIC together with an electronic circuit, requiring delicate manufacturing processes for an analogue IC in accordance with e.g. so-called "0.5 µm rule" in view of its circuit size and frequency characteristics. Consequently, the resulting light receiving element on completion of the manufacturing process has an expensive manufacturing cost per area. In addition, since an onboard part for the semiconductor laser and the etched optical-path conversion mirror are also manufactured integrally with the PDIC, the overall area of the optical device becomes lengthy and expensive as a whole.

The manufacturing of this optical device has to use a semiconductor substrate suitable to the manufacturing processes for analogue IC while having a crystal orientation suitable to manufacture the optical-path conversion mirror. Furthermore, as it is necessary to allow an overall semiconductor substrate to pass through the manufacturing processes for analogue IC and an etching process, the manufacturing time is apt to be extended and a previously-manufactured part of the semiconductor substrate may be damaged by the subsequent manufacturing process.

Moreover, as the arrangement of light receiving and emitting parts is restricted by the integrated semiconductor substrate, it is impossible to alter the mutual positional relationship between the light receiving part and the light emitting part once the light receiving element substrate is manufactured, precluding a correction of the optical device by adjustment and a correspondence for a minimal design change.

In the optical device disclosed in Japanese Patent Publication Laid-open No. 2000-196176, as the optical-path conversion mirror, the sub-mount and the semiconductor laser are mounted on the PDIC separately, there exists a problem that respective positional errors of the optical-path conversion mirror, the sub-mount and the semiconductor laser in mounting them on the PDIC are accumulated on each other. In addition, due to a large number of components, the mounting processes are increased to make the manufacturing process cumbersome and complicated. Furthermore, a glass mirror forming the optical-path conversion mirror is expensive.

In a constitution having two light sources of different wavelengths integrated with each other and also sharing a light receiving element, due to positional restrictions on the sub-mount and the optical-path conversion mirror, it is impossible to optionally determine the positions of respective spots of homeward fluxes diffracted by a hologram element or the like, precluding an optimization of the optical balance of the optical device. Alternatively, there is a need of providing a step in the thickness direction of either the semiconductor laser or the sub-mount in order to adjust the positions of luminous points. It should be noted that a process of providing the step is hard to be realized or becomes insufficiently.

Under the above-mentioned situation, an object of the present invention is to provide an optical device integrating a semiconductor laser mounted on a sub-mount united and a light receiving element substrate, which device is capable of reducing the number of components, avoiding a deterioration of performance due to the accumulation of mutual positional errors of respective components, ensuring the degree of freedom in setting optical parameters (e.g. light intensity distribution of emit light and its polarization direction) while simplifying the adjustment process and finally optimizing the positioning of spots of homeward fluxes on an identical light receiving element in both cases of multiple wavelengths without requiring any complicated process.

In order to achieve the above objects, according to the first aspect of the present invention, there is provided an optical device comprising: a wiring substrate; a sub-mount where an onboard part for mounting a semiconductor laser thereon and an optical-path conversion mirror for reflecting laser light emitted from the semiconductor laser are integrated with each other, the sub-mount being arranged on the wiring substrate; and a light receiving element substrate arranged on the wiring substrate.

According to the second aspect of the present invention, there is also provided an optical device comprising: a wiring substrate; a sub-mount where an onboard part for mounting a semiconductor laser thereon and an optical-path conversion mirror for reflecting laser light emitted from the semiconductor laser are integrated with each other, the sub-mount being arranged on the wiring substrate; a light receiving element substrate arranged on the wiring substrate; and a light receiving element arranged on the light receiving element substrate and divided into a plurality of light receiving regions by a first parting line substantially parallel to a tangential line of a recording track of an optical disc projected on the light receiving element substrate and a second parting line perpendicular to the first parting line, wherein the sub-mount is arranged on the wiring substrate so that a longitudinal axis of the sub-mount is inclined to the tangential line of the recording track in view from an upside of the optical device, whereby at least one of: a long axis in cross section of light flux, which is emitted from the semiconductor laser, further reflected by the optical-path conversion mirror and further irradiated toward the optical disc; a short axis in cross section of the light flux; and a linear polarization of the light flux, is substantially neither parallel nor perpendicular to the first parting line and the second parting line, thereby making an predetermined angle to the first parting line.

According to the third aspect of the present invention, there is also provided an optical device comprising: a wiring substrate; a sub-mount on which at least two semiconductor lasers composed of a first semiconductor laser and a second semiconductor laser are mounted in parallel with each other and in which an onboard part for mounting the first and second semiconductor lasers thereon and an optical-path conversion mirror for reflecting laser lights emitted from the first and second semiconductor lasers are integrated with each other, the sub-mount being arranged on the wiring substrate; a light receiving element substrate arranged on the wiring substrate; and a light receiving element arranged on the light receiving element substrate and divided into first and second light receiving regions by at least one parting line, wherein the sub-mount is arranged on the wiring substrate so that one light gravity center of an optical spot, which is formed on the light receiving element by homeward flux of light emitted from the first semiconductor laser and reflected by an optical disc, and another light gravity center of an optical spot, which is formed on the light receiving element by homeward flux of light emitted from the second semiconductor laser and reflected by the optical disc, are together positioned on the parting line.

According to the fourth aspect of the present invention, there is also provided an optical device comprising: a wiring substrate; a sub-mount on which at least two semiconductor lasers composed of a first semiconductor laser and a second semiconductor laser are mounted in parallel with each other and in which an onboard part for mounting the first and second semiconductor lasers thereon and an optical-path conversion mirror for reflecting laser lights emitted from the first and second semiconductor lasers are integrated with each other, the sub-mount being arranged on the wiring substrate; a light receiving element substrate arranged on the wiring substrate; and a light receiving element arranged on the light receiving element substrate and divided into first and second light receiving regions by at least one parting line, wherein a first apparent luminous point of the first semiconductor laser by the optical-path conversion mirror is arranged in a position so that a calculated output of a difference between respective outputs generated from the first and second light receiving regions both receiving homeward flux of light emitted from the first semiconductor laser and reflected by an optical disc, becomes equal to zero, and assuming that "d" represents an interval between respective luminous points of the first and second semiconductor lasers, the sub-mount is arranged on the wiring substrate so that its longitudinal axis is inclined to a direction parallel to a top surface of the light receiving element substrate and perpendicular to the parting line by an angle θ, and that ΔY represents a difference in height between the first apparent luminous point and a second apparent luminous point of the second semiconductor laser by the optical-path conversion mirror, there is established a relationship of ΔY=−d sin θ, whereby a calculated output of a difference between respective outputs generated from the first and second light receiving regions both receiving homeward flux of light emitted from the second semiconductor laser and reflected by an optical disc, becomes equal to zero.

BRIEF DESCRIPTION OF THE DRAWINGS

FIG. 4 is a top view showing a positional relationship between the optical device of the present invention and an optical disc;

DETAILED DESCRIPTION OF THE PREFERRED EMBODIMENTS

There will be below described embodiments of the present invention in detail with reference to drawings.

1$^{st}$. Embodiment

Figure 1:
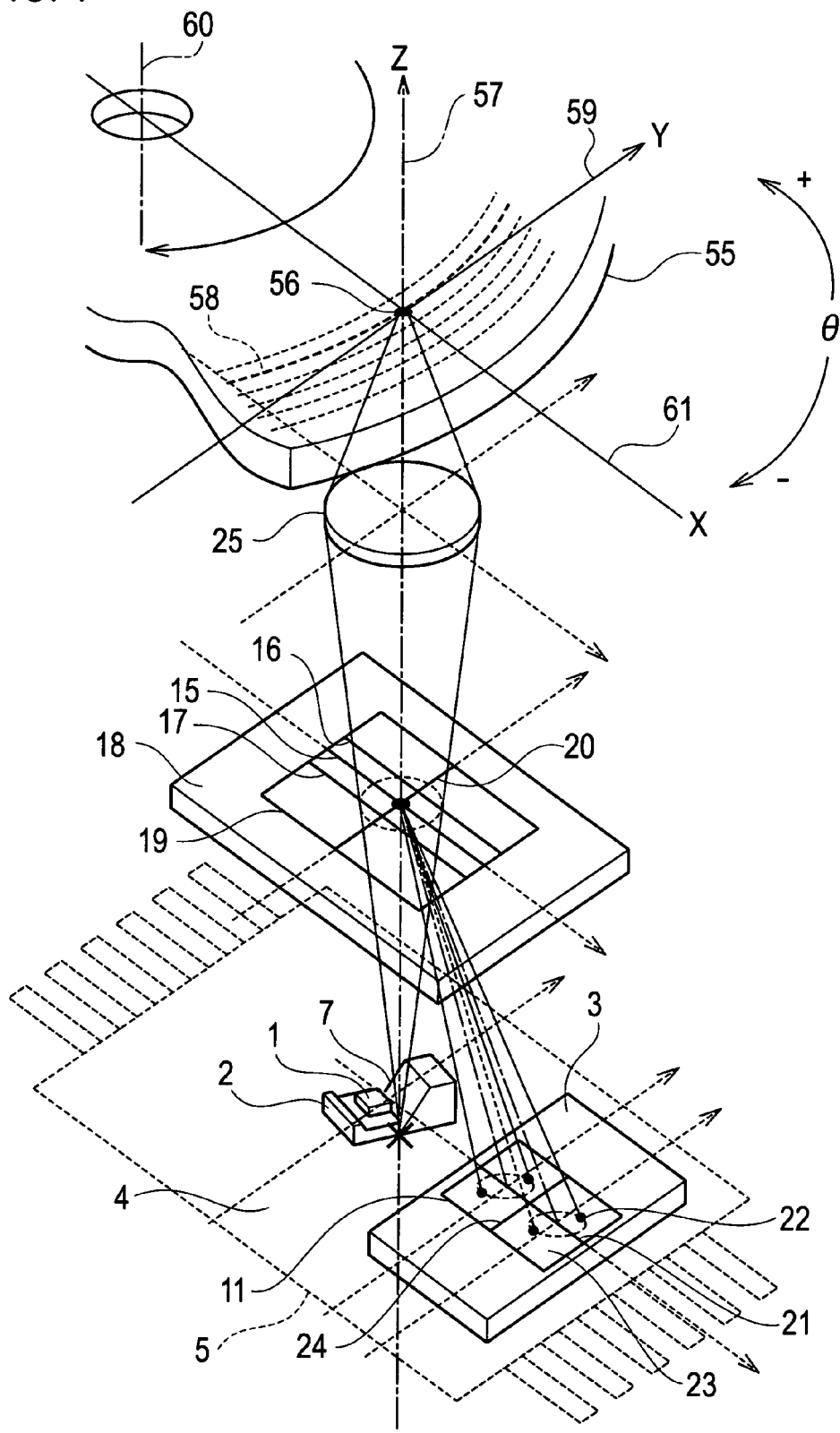
FIG. 1 is a perspective view showing the constitution of an optical pickup using an optical device of the present invention.

FIG. 1 is a perspective view showing the constitution of an optical pickup using an optical device of the present invention.

As shown in FIG. 1, the optical device of the present invention is applicable to an optical pickup that irradiates convergent light to an optical disc 55 as an information recording medium, which has information signals recorded along a recording track 58 and that detects reflecting light of the convergent light from the optical disc 55 to read the information signals.

The optical device of the invention includes a lead frame 4 which comprises a punching material made from a metal plate and which is integrated with a resinous package 5 to form a reinforced wiring substrate. Mounded on the lead frame 4 at its exposed metallic portion (mounting part) is a sub-mount 2 having an optical-path conversion mirror 7 integrated therewith. On the sub-mount 2, a semiconductor laser 1 is also arranged so as to be opposed to the optical-path conversion mirror 7. The sub-mount 2 is formed, at a position opposed to the optical-path conversion mirror 7, with a planar section for mounting the semiconductor laser 1 thereon.

A PDIC (photo detector IC) 3 is mounted on the lead frame 4) to be lateral to the sub-mount 2. On the upper surface of the PDIC 3, there are formed later-mentioned light receiving areas, not-shown amplifying and calculating circuits, etc. within a range of several microns from the top surface, by semiconductor manufacturing processes.

The sub-mount 2 and the PDIC 3 are mounted on the lead frame 4 in a mutually-determined positional relationship.

In the optical pickup, light flux emitted from the semiconductor laser 1 on the sub-mount 2 is reflected by the optical-path conversion mirror 7 and successively transmitted through a hologram element 19 to be incident on an objective lens 25. It is noted that the hologram element 19 does not have any action on the incident light flux (outward light).

The light flux incident on the objective lens 25 changes into convergent light by the objective lens 25 and is collected onto a signal recording surface of the optical disc 25, forming an optical spot 56 thereon.

Then, the light reflected on the signal recording surface of the optical disc 55 (i.e. homeward light) gets back to the objective lens 25 and subsequently enters the hologram element 19 through the objective 25. Note, the hologram element 19 is defined on a plane surface containing a transit area of the above reflection light from the optical disc 55. Again, the hologram element 19 is configured to have a fine periodical structure on a transparent substrate 18.

In this specification, a parallel axis to a tangential line of the recording track 58 on the optical disc 55 (i.e. Y-axis of FIG. 1) will be referred to as "tangential axis 59", while an axis (i.e. X-axis of FIG. 1) passing through a rotational center axis 60 of the optical disc 55 and perpendicular to the tangential axis 59 will be referred to as "radial axis 61", hereinafter. An optical axis 57 of the outward and homeward fluxes with respect to the optical disc 55 (i.e. Z-axis of FIG. 1) intersects with both the tangential axis 59 and the radial axis 61 at right angles.

The reflection light incident on the hologram element 19 from the optical disc 55 is subjected to diffraction effect of the element 19. The hologram element 19 is divided into a plurality of regions (e.g. eight regions) by multiple parting lines 15, 16, 17 and 20. The reflection light from the optical disc 55 is subjected to different or identical diffraction effect at respective regions of the hologram element 19. On receipt of the diffraction effect, the reflection light from the optical disc 55 diverges from zero-order light at a predetermined angle with the optical axis 57, in the form of a primary diffraction light. This primary diffraction light is emitted from the hologram element 19 in two groups of diffraction lights (i.e. four lights in total). Then, these diffraction lights in two groups enter the PDIC 3 at respective separate positions from each other spatially.

A light receiving element 11 is arranged on the PDIC 3. Two groups of diffraction lights through the hologram element 19 all enter the light receiving element 11 to form optical spots 22, 23 with no leakage. In this way, the light receiving element 11 is adapted so as to detect these reflection lights transmitted through the hologram element 19.

The light receiving element 11 is divided into four light receiving areas by two parting lines 21, 24. The light receiving element 11 carries out photoelectric conversion corresponding to the light intensity of incident flux to output a signal, with respect to each light receiving area. Owing to the above division of the light receiving areas, the light receiving element 11 generates four signal outputs. With calculation of these four signal outputs, there are produced readout signals of the information signals recorded in the optical disc 55 and also, a variety of error signals.

Figure 2:
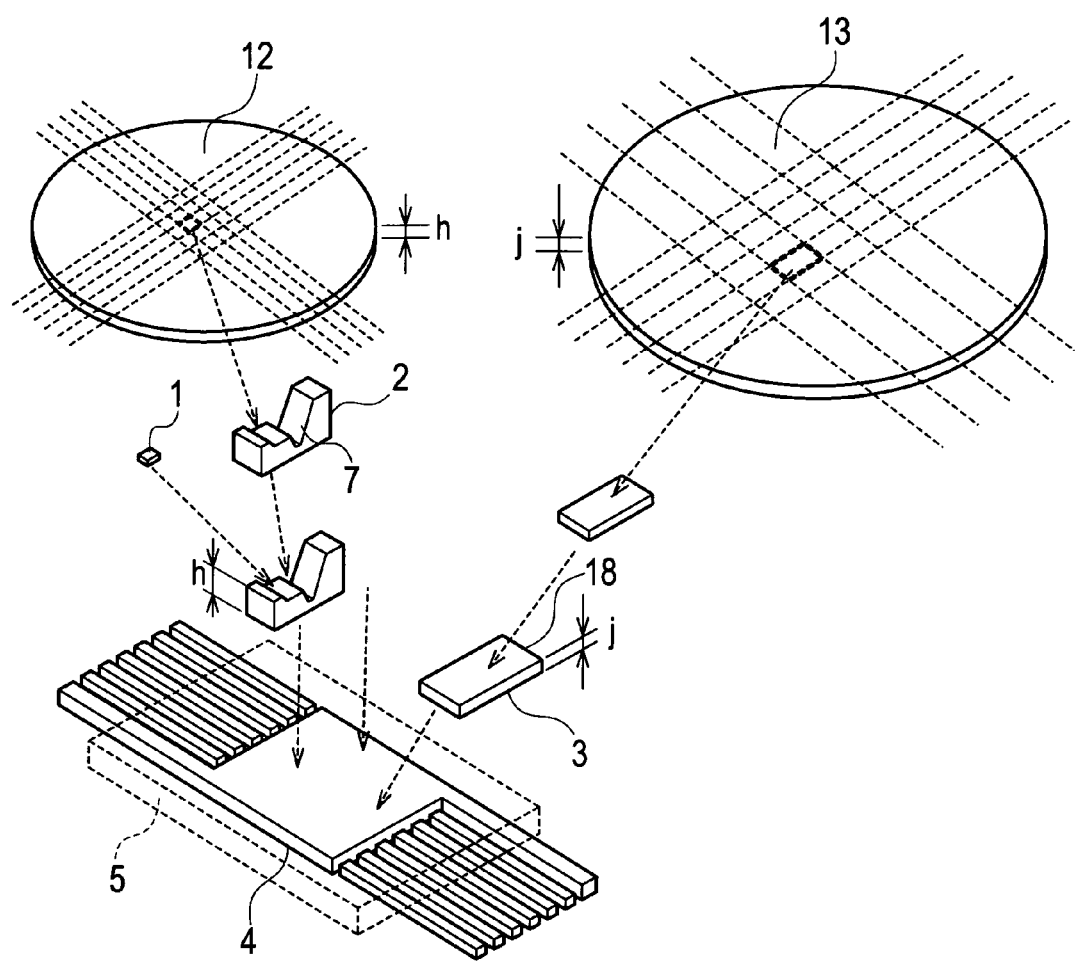
FIG. 2 is an exploded perspective view showing the constitution of the optical device of the present invention.

FIG. 2 is an exploded perspective view showing the constitution of the optical disc of the present invention.

In the optical device, as shown in FIG. 2, the sub-mount 2 having the optical-path conversion mirror 7 is manufactured in an identical wafer (Si monocrystalline substrate) 12. That is, the sub-mount 2 is produced by first forming a plurality of sub-mounts in the wafer 12 and successively cutting the wafer 12 into individual sub-mounts (pieces) 2.

As for the wafer 12 for producing the sub-mount 2, there may be employed a cheap substrate suitable for manufacturing the optical-path conversion mirror 7 as an etched mirror, namely, "off-substrate". For instance, the substrate may be made from a 4 inch wafer.

Meanwhile, the PDIC 3 is manufactured in a different wafer 13 from the sub-mount 2. That is, the PDIC 3 is produced by first forming a plurality of PDICs in the wafer 13 and successively cutting the wafer 13 into individual PDICs (pieces) 3.

As for the wafer 13 for producing the PDIC 3, on the premise of using Epi wafer (so-called "just substrate") that is suitable for high-speed calculating circuits, the wafer 13 is preferably made from e.g. 6 inch wafer that can be implemented by a manufacturing device on the application of submicron rule.

In this way, since the sub-mount 2 and the PDIC 3 are manufactured by different wafers 12, 13 respectively, it is possible to select optimal manufacturing processes, sizes and thicknesses for the sun-mount 2 and the PDIC 3 independently of each other.

In this optical device, the surface of the PDIC 3 is defined as a device's datum surface in optics and mechanics. With the definition, the sub-mount 2 and the semiconductor laser 1 are mounted on the lead frame 4 to an accuracy of the micron order, as the basis of a not-shown alignment mark or the like, which has been formed on the PDIC 3 in a semiconductor manufacturing process.

Figure 3A:
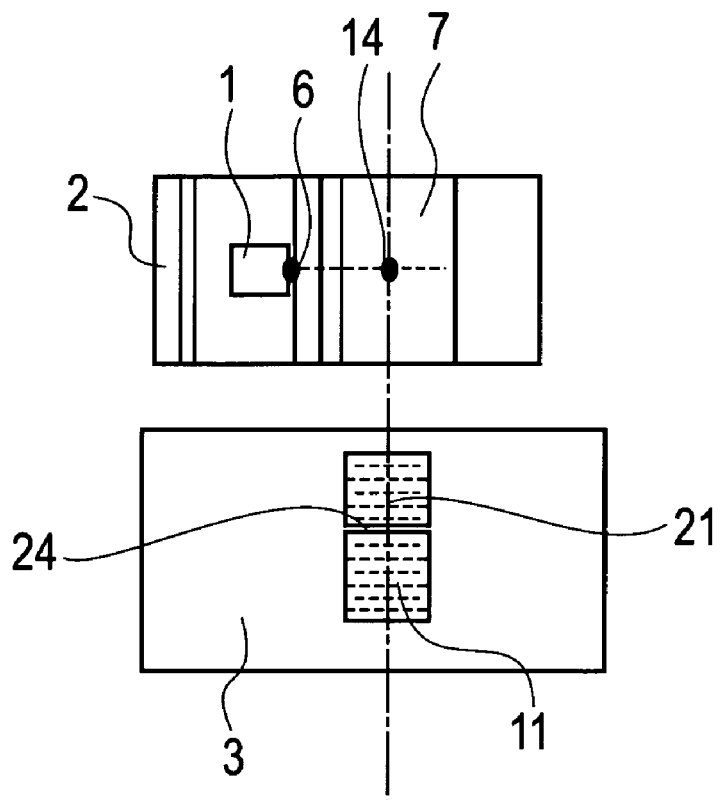
FIG. 3A is a top view showing the constitution of the optical device of the present invention.
Figure 3B:
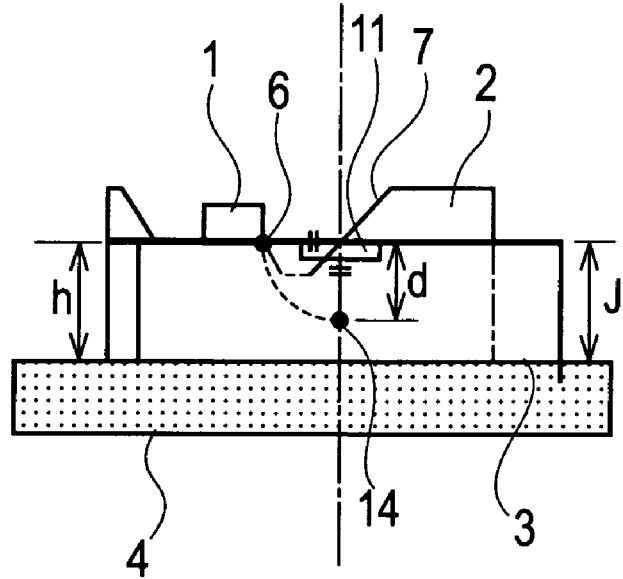
FIG. 3B is a side view showing the constitution of the optical device of the present invention.

FIG. 3A is a top view showing the constitution of the optical device of the present invention, while FIG. 3B is a side view of the optical device.

In this optical device, the optical-path conversion mirror 7 is formed integrally with the sub-mount 2 mounting the semiconductor laser 1, in advance. Therefore, in the process of mounting the semiconductor laser 1 and the sub-mount 2, one has only to control only the mutual positional relationship between the semiconductor laser 1 and the sub-mount 2.

If the optical-path conversion mirror 7 is not formed in one body with the sub-mount 1 in the conventional optical device, then it is necessary to control the mutual positional relationship between the sub-mount 2 and the optical-path conversion mirror 7 with high accuracy. Further, considering that both of the sub-mount 2 and the mirror 7 are to be mounted in different processes respectively, a gap of several tens of microns has to be ensured between the sub-mount 2 and the mirror 7. For these reasons, in the conventional optical device, there is a limit to shorten an interval between a luminous point 6 of the semiconductor laser 1 and an apparent luminous point 14 as a result of the reflection on the mirror 7.

On the contrary, in the optical device of the present invention, as the optical-path conversion mirror 7 determining the position of the apparent luminous point 14 is formed integrally with the sub-mount 2 determining the position of the luminous point 6 and also formed on the identical wafer 12, there is no need of ensuring the above-mentioned gap.

Thus, the optical device of the invention allows the interval between the luminous point 6 and the apparent luminous point 16 to be equal to several tens of microns relatively. On condition that the flux emitted from the luminous point 6 in a conically-shaped manner has a constant in effective divergence angle (e.g. approx. 10 degrees on each side) as shown in FIG. 1, it is possible to reduce a necessary reflection area to be ensured on the optical-path conversion mirror 7, in proportion to the square of an interval between the luminous point 6 and the apparent luminous point 14. Consequently, as this reduction of the necessary reflection area facilitates close control of an emitting wavefront, for example, control of the surface condition of the optical-path conversion mirror 7 that requires a RMS (Root Mean Square) value of wavefront aberration less than approx. $0.05\lambda$ ($\lambda$: wavelength of flux), it is possible to improve the process yield when forming the mirror 7 on a Si wafer by means of etching.

FIG. 4 is a top view showing the positional relationship between the optical device of the present invention and the optical disc.

Specifically, FIG. 4 illustrates the positional relationship where the optical device is optically mapped on the optical system of the optical pickup through the optical disc 55 and also illustrates both normal light intensity distribution (cross-section shape of flux) and polarization direction of the flux.

In the optical device of the present invention, the sub-mount 2 is arranged and fixed in a position rotated to the tangential line of the recording track 58 of the optical disc 55, the tangential line being projected on the lead frame 4. In other words, the sub-mount 2 is arranged so that its longitudinal axis L (see FIG. 4) is inclined to the tangential line 59 of the recording track 58 of the optical disc 55 in view from the upside of the optical device. Thus, as for the flux emitted from the semiconductor laser 1 and subsequently emitted out of the optical device upon the reflection of the optical-path conversion mirror 7 of the sub-mount 2, any one or two of a long axis direction of the cross-section shape of the flux, a short axis direction thereof and a direction of linear polarization are neither generally parallel nor perpendicular to the parting lines 21, 24 of the light receiving element 11, making predetermined angles with those lines.

Therefore, according to the optical pickup using this optical device, when transmitting the return light from the optical disc 55 to the light receiving element 11 through the hologram element 19, it is possible to adjust a relative angle between the polarization direction of emit light and the recording track 58 and the intensity distribution at an eye face of the objective, both of which influences the reproducing quality of the optical disc 55, with no restriction by the detection method of tracking error signals and focus error signals out, allowing an optimal polarization direction or light intensity at an eye end of the objective lens to be established. Furthermore, it is possible to satisfy the optical performance in both linear density and recording track density.

Figure 8:
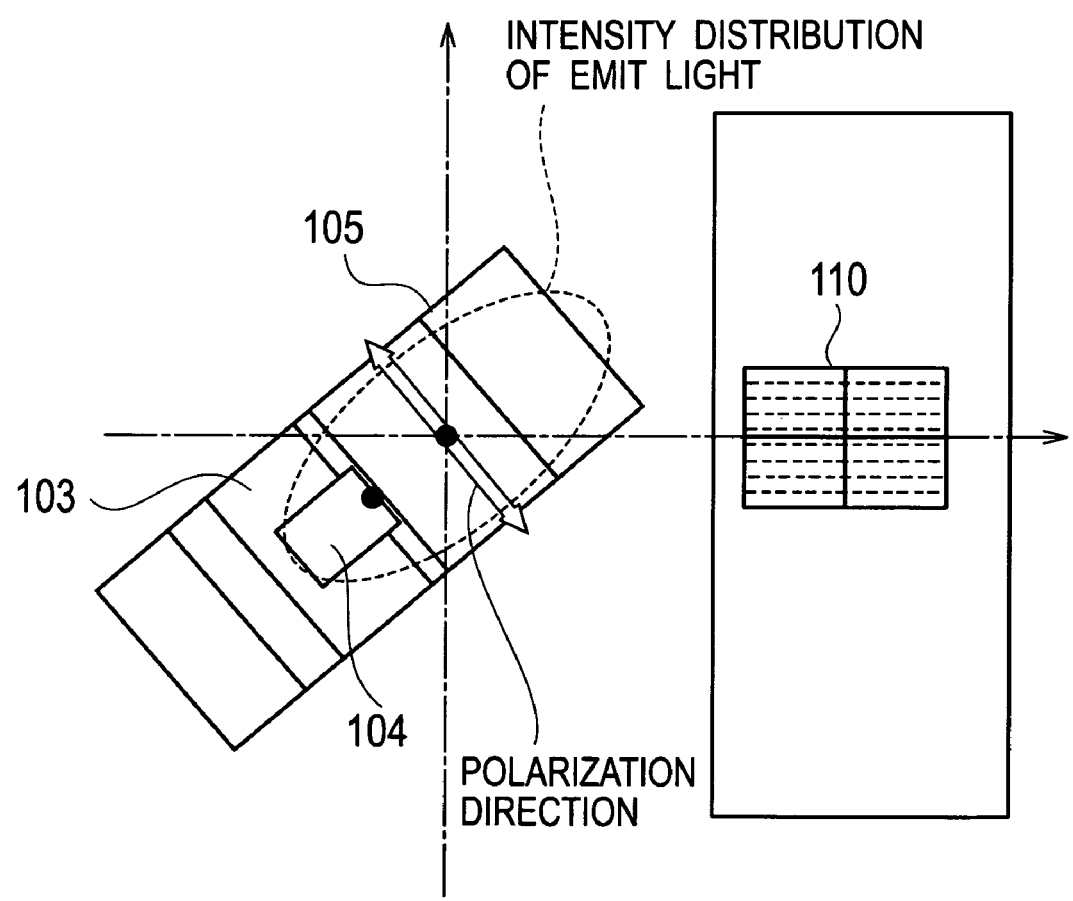
FIG. 8 is a plan view showing the constitution of a conventional optical device where a semiconductor laser and a light receiving element are united for integration, the optical device being rotated with respect to the recording track.

Referring to FIG. 8, the conventional optical device will be described for comparison with the present invention, in brief. FIG. 8 is a plan view showing the constitution of the conventional optical device where a semiconductor laser and a light receiving element are united to each other for integration, which is inclined to the recording track.

With the use of the conventional device having a semiconductor laser 104 and a light receiving element 110 integrated with each other as shown in FIG. 8, when inclining the direction of linear polarization of the emit light to the recording track 58 at a predetermined angle while maintaining the relative relationship between the apparent luminous point and the light receiving element 110 thereby to adjust the intensity distribution of the emit light in the tangential direction and also that in the radial direction, it has been required to determine the mutual positional relationship between an optical-path conversion mirror 105 and a sub-mount 103 on completion of not only rotating both of the mirror 105 and the sub-mount but also calculating the mutual positional relationship precisely.

On the contrary, according to the optical device of the present invention, as the optical-path conversion mirror 7 is integrated with the sub-mount 2, upon precise determination of the mutual positional relationship between the luminous point of the semiconductor laser 1 and the optical-path conversion mirror 7, it is possible to position them on the lead frame 4 integrally while maintaining the above positional relationship therebetween, accomplishing the positioning of these components simply and precisely.

Note, in an optical pickup for Blu-ray Disc, there is a case of requiring similar intensity distributions in both the tangential axis 59 and the radial axis 61 since the pickup is sensitive to the light intensity distribution up to the objective lens 25. Then, there may be required a beam shaping optical system.

It is noted that there may be employed an off substrate for the wafer 12 and a just substrate for the wafer 13. The just substrate denotes one obtained by carving out Si ingot material at an angle parallel to a designated crystal plane. The off substrate denotes one obtained by carving out Si ingot material at a predetermined angle to a designated crystal plane thereof.

Figure 5:
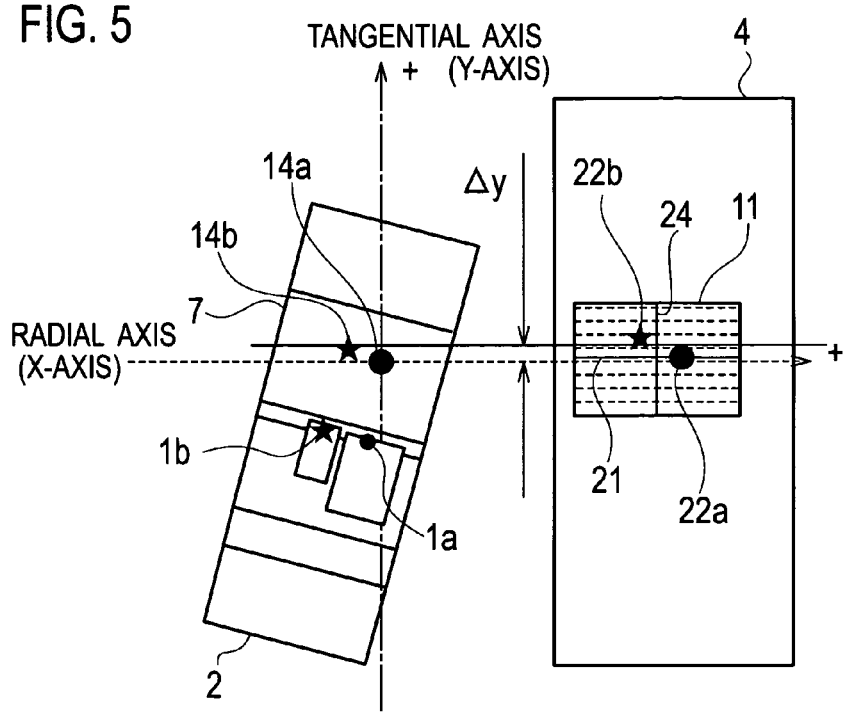
FIG. 5 is a plan view showing the arrangement where the optical device is rotated with respect to a recording track.

FIG. 5 is a plan view showing the arrangement where the optical device of the present invention is inclined to the recording track.

In this optical device, as shown in FIG. 5, a laser chip (first semiconductor laser) 1a having a waveband of 650 nm for DVD and another laser chip (second semiconductor laser) 1b having a waveband of 780 nm for CD are respectively formed by different laser chips and also juxtaposed to each other on the sub-mount 2. Through the optical-path conversion mirror 7 integrated with the sub-mount 2, respective luminous points of these laser chips 1a, 1b are observed in the form of apparent luminous points 14a, 14b in view from the objective lens, providing substantial luminous points in the optical system of the optical pickup.

In operation of the above optical device, when reproducing DVD or CD, either the laser chip 1a or the laser chip 1b becomes luminous. The flux emitted from the laser chip 1a (or 1b) is irradiated on the optical disc 55 through the objective lens 25 and further reflected by the optical disc 55. The reflection light is transmitted through the objective lens 25 again and further diffracted in separation to the radial (+) direction by the hologram element 19 integral with the objective lens 25. This flux is irradiated on the light receiving element 11, in the form of homeward spots 22a, 22b having finite sizes determined by numerical apertures of the objective lens 25 mainly. Then, the light receiving element 11 applies photoelectric conversion (I-V conversion) on the received flux and subsequently outputs signals upon amplification.

To generate various error signals, such as focus error signal and tracking error signal, for operating an optical disc basically, the light receiving area of the light receiving element 11 is divided into a plurality of regions. Subsequently, output signals from the respective light receiving regions are subjected to an addition-subtraction operation.

Figure 6:
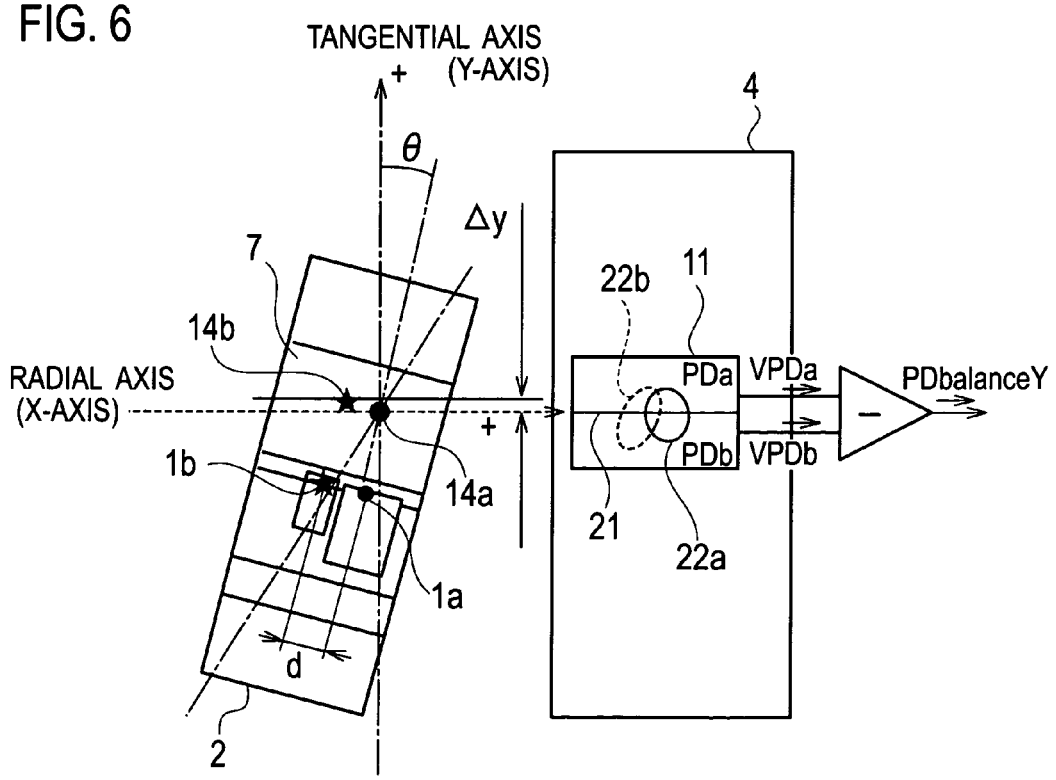
FIG. 6 is a detailed plan view showing the arrangement where the optical device is rotated with respect to the recording track.

FIG. 6 is a detailed plan view showing the arrangement where the optical device of the present invention is inclined to the recording track.

In the optical device using the hologram element 19, it is general that the light receiving element 11 is arranged so that the parting line 21 of the light receiving regions in the radial direction accords with the diffraction direction by the hologram element 19 in order to avoid the influence of wavelength dependency on a diffraction angle at the hologram element 19, as shown in FIG. 6. It is also said that to maintain the balance of light receiving capability between respective light receiving regions PDa, PDb, which are segmentalized in the tangential direction by the parting line in the radial direction, is of importance in view of maintaining the performance of the optical device.

By juxtaposing respective luminous points of the laser chips 1a, 1b in the direction of radial axis and further conforming the diffraction direction to the direction of radial axis, it is possible to allow the homeward spots 22a, 22b to be generally positioned on the parting line 21 in the direction of radial axis. Two apparent luminous points 14a, 14b cannot be laid to overlap each other, and they are separated from each other at a luminous points' interval d of approx. 120 nm.

Due to a combination of the positional disagreement of the apparent luminous points 14a, 14b with the positional dependence of lens effect (i.e. direction of diffraction) of the hologram element 19, there has been confirmed, by simulations and actual measurements, a phenomenon that homeward fluxes having openings determined by the objective lens 25 do not strictly overlap each other on the light receiving element 11 in the tangential direction at each wavelength, for example, respective gravity centers of light intensity are deviated from each other less than approx. 10 μm on the surface of the light receiving element, as shown in FIG. 5. In addition, it is also known that when reproducing an optical device for multiple-standards (e.g. DVD and CD), a deterioration in the margins of respective reproducing performances and a disagreement of respective best points arise from the above phenomenon.

In the optical device of the present invention, as the sub-mount 2 integrated with the optical-path conversion mirror 7 has degrees of rotational freedom on the lead frame 4 as shown in FIGS. 5 and 6, it is possible to fix the positional relationship of the sub-mount 2 to the light receiving element 11 with respect to one wavelength and also possible to fine adjust the positional relationship with respect to the other wavelength. Owing to this fine adjustment, the above-mentioned phenomenon can be excluded.

That is, it is firstly performed to adjust the mutual positions of the laser chip 1a for DVD and the laser chip 1b for CD so that the apparent luminous points 14a, 14b of these laser chips 1a, 1b are present on an identical radial axis (X-axis) and the light gravity center of the homeward light spot 22a of laser light for DVD is positioned on the parting line 21. Here, such a condition that the apparent luminous points 14a, 14b of the laser chips 1a, 1b are present on the radial axis (X-axis) is defined as a reference position.

Under such a condition, when the homeward light of the laser light for CD emitted from the laser chip 1b, which has been subsequently reflected by the optical disc 55 and further diffracted by the hologram element 19, is irradiated onto the light receiving regions, the light gravity center of the resulting homeward light spot 22b is shifted from the parting line 21 by several microns on the tangential axis (Y-axis) due to the above-mentioned phenomenon.

Meanwhile, an arithmetic output of a difference between outputs VPDa, VPDb from the light receiving regions PDa, PDb on both sides of the parting line 21 becomes equal to zero only when the light gravity centers of the homeward light spots 22a, 22b accord with the parting line 21. Otherwise, the arithmetic output will be equal to the following output (PDbalanceY) proportional to the above displacement in the direction of the tangential axis (Y-axis), that is, PDbalanceY= (VPDa−VPDb)/(VPDa+VPDb).

The position of the apparent luminous point 14b in the tangential direction providing an output (PDbalanceY) of zero is determined ambiguously. Consequently, a height difference $\Delta Y$ (i.e. a distance component in the direction Y-axis perpendicular to the parting line 21) of the apparent luminous point against the reference position of the apparent luminous point 14a is determined as well.

As mentioned before, since the interval "d" between the apparent luminous point 14a of the laser light for CD and the apparent luminous point 14b of the laser light for DVD is a predetermined value (approx. 120 μm), respective outputs (PDbalanceY) of zero for CD and DVD could be attained if only rotating the sub-mount 2 about the apparent luminous point 14a of the laser light for DVD as a rotational center by an angle θ, thereby making the device's performances for DVD and CD compatible advantageously. In connection, it is noted that the direction of θ is illustrated in FIG. 1.

Thus, by adjusting the position of the sub-mount 2 on the lead frame 4 in rotation by an angle θ to Y-axis thereby to control the component $\Delta Y$ of the interval "d" in the direction of Y-axis, it is established that the output of a difference between outputs VPDa, VPDb from the light receiving regions PDa, PDb receiving the homeward flux emitted from the laser chip 1b for CD and successively reflected by the optical disc 55 becomes equal to zero. The component $\Delta Y$ of the luminous points' interval "d" in the direction of Y-axis is calculated as $\Delta Y = -d \sin \theta$.

Thus, the angle θ is calculated as $\theta = -\sin^{-1}(\Delta Y/d)$.

Suppose that, for instance, the luminous points' interval "d" is 120 (μm) and the height difference $\Delta Y$ of the optimal apparent luminous point is 10 (μm). Then, the angle θ becomes −4.78 (deg) as $\theta = -\sin^{-1}(\Delta Y/d) = -\sin^{-1}(10/120) = -4.78$.

In short, if only rotating the sub-mount 2 about the apparent luminous point 14a of the laser light for DVD by 4.78 degrees in the clockwise direction (one direction), it is possible to null the output (PDbalanceY) in each case of reproducing CD and DVD.

It is noted that during the mass production of this optical device, there is no need of measuring the outputs (PDbalanceY) for CD and DVD or the positions of respective light gravity centers of homeward spots in individual optical devices. Then, by setting constant values for these parameters through preliminary simulations or actual measurements at an experimental production, the production management could be implemented on the ground of these constant values. In addition, the on-board position of the sub-mount 2, its rotating center and rotating angle could be controlled by means of image recognition and calculations with ease.

$2^{nd}$. Embodiment

In this optical device, as mentioned before, the sub-mount 2 is manufactured from the wafer 12 for sub-mount, while the PDIC 3 is manufactured from the wafer 13 for PDIC. Suppose that, as shown in FIG. 2, the wafer 12 for sub-mount has a thickness "h", while the wafer 13 for PDIC has a thickness "j". Then, there is produced a thickness error of approx. ±3 μm due to a difference in thickness between the wafer 12 and the wafer 13 or due to an in-plane distribution in thickness of a wafer.

Here, it is assumed that the sub-mount 2 has a thickness "h'" containing a thickness error $\Delta h$, while the PDIC 3 has a thickness "j'" containing a thickness error $\Delta j$. Then, as shown in FIG. 3B, if both errors extend in the opposite direction to each other, a difference in height between the apparent luminous point 14 and the surface of the light receiving element 14 will have a total error $\Delta d = \Delta h + \Delta j$ with respect to a design value "d". As mentioned above, assuming that the thickness errors of the wafers 12, 13 are equal to ±3 μm respectively and the error limit of a difference in height between the apparent luminous point 14 and the surface of the light receiving element 11 is set to ±5 μm, there is a possibility that the total error $\Delta d$ exceeds the error limit of 5 μm since the total error $\Delta d$ may amount to 6 μm at a maximum $\Delta d_{max}$ (=3+3=6 μm).

Figure 7:
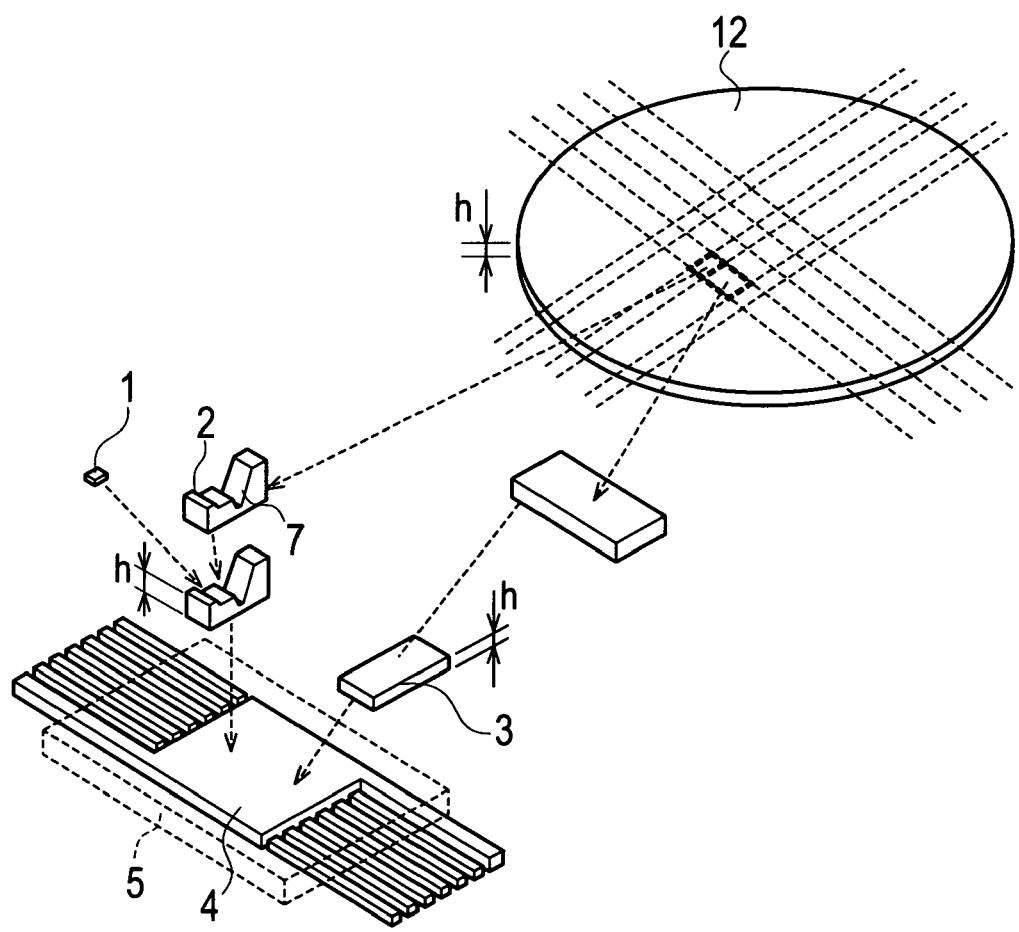
FIG. 7 is an exploded perspective view showing another example of the optical device of the present invention.

FIG. 7 is an exploded perspective view showing another example of the optical device of the present invention.

In an application placing greater emphasis on optical accuracy than a merit brought by manufacturing the sub-mount 2 and the PDIC 3 from different wafers, therefore, all of the sub-mount 2, the optical-path conversion mirror 7 and the PDIC 3 are built on a signal wafer 12 and successively severed into adjoining chips (pieces) for an identical optical device, as shown in FIG. 7. Then, it is possible to regard these chips as elements having the same thickness, allowing the optical accuracy of the optical device to be improved in height.

That is, in the optical device of this embodiment, a plurality of sub-mounts 2 and a plurality of PDICs 3 are manufactured on an identical wafer 12 and subsequently severed into respective pieces. Focusing attention on a fact that each of the sub-mount 2 and the PDIC 3 is made from a Si monocrystalline substrate, owing to the similarity of semiconductor process etc., it is possible to manufacture both the sub-mount 2 and the PDIC 3 in the identical wafer 12. Then, a thickness "h" of the wafer 12 becomes a common value in between the sub-mount 2 and the PDIC 3.

In addition, if the sub-mount 2 and the PDIC 3 are respectively shaped with a line in common, it is possible to design a manufacturing instruction so that they are arranged to lie adjacent to each other in the wafer 12 and also possible to manufacture the sub-mount 2 and the PDIC 3 of perfectly equal length, in spite of an "in-plane" variation in thickness of the wafer due to a subsequent grinding process. For instance, as shown in FIG. 7, it is possible to juxtapose the sub-mount 2 and the PDIC 3 in a manner that a long side of the former accords with a short side of the latter. In this case, they will be together mounted on the identical lead frame 4 after rotating the cutout PDIC 3 by an angle of 90 degrees.

Similarly in this embodiment, the surface of the PDIC 3 is defined as a device's datum surface in optics and mechanics. With the definition, the semiconductor laser 1 is mounted on the sub-mount 2 to an accuracy of the micron order, as the basis of a not-shown alignment mark or the like, which has been formed on the PDIC 3 in a semiconductor manufacturing process.

Now, suppose that the sub-mount 2 has a thickness "h'" containing a thickness error $\Delta h$, and the PDIC 3 has a thickness "h'" containing a thickness error $\Delta h$ as well. Then, as shown in FIG. 3B, since both errors extend in the same direction, a difference in height between the apparent luminous point 14 and the surface of the light receiving element 11 will have no error with respect to a design value "d". As mentioned above, even supposing that the thickness error of the wafer 12 is equal to ±3 μm, the error of a difference in height between the apparent luminous point 14 and the surface of the light receiving element 11 will result in approx. 0 μm, falling within the range of the error limit of 5 μm.

In this embodiment, additionally, since the optical-path conversion mirror 7 is formed integrally with the sub-mount 2 as similar to the previously-mentioned embodiment, it is possible to make all the sub-mount 2, the optical-path conversion mirror 7 and the PDIC 3 from an identical wafer, improving the overall positional accuracy of the optical device.

According to the present invention, with the reduction in the number of components, it is possible to set the light intensity distribution of the emit light and the polarization direction optionally while avoiding a deterioration of the device's performance due to the accumulation of mutual positional errors of respective components. In addition, without requiring any complicated process, there can be provided an optical device that can optimize the positioning of spots of homeward fluxes on an identical light receiving element in both cases of multiple wavelengths.

Repeatedly, the optical device of the invention is employed in an optical pickup for recording and/or reproducing information to and/or from optical information recording media, such as optical discs, mainly. Finally, it will be understood by those skilled in the art that the foregoing descriptions are nothing but two embodiments of the disclosed optical device and therefore, various changes and modifications may be made within the scope of claims.

What is claimed is:

1. An optical device comprising:
   a wiring substrate;
   a sub-mount where an onboard part for mounting a semiconductor laser thereon and an optical-path conversion mirror for reflecting laser light emitted from the semiconductor laser are integrated with each other, the sub-mount being arranged on the wiring substrate;
   a light receiving element substrate arranged on the wiring substrate; and
   a light receiving element arranged on the light receiving element substrate and divided into a plurality of light receiving regions by a first parting line substantially parallel to a tangential line of a recording track of an optical disc projected on the light receiving element substrate and a second parting line perpendicular to the first parting line, wherein
   the sub-mount is arranged on the wiring substrate so that a longitudinal axis of the sub-mount is inclined to the tangential line of the recording track in view from an upside of the optical device, whereby at least one of:
   a long axis in cross section of light flux, which is emitted from the semiconductor laser, further reflected by the optical-path conversion mirror and further irradiated toward the optical disc;
   a short axis in cross section of the light flux; and
   a linear polarization of the light flux,
   is substantially neither parallel nor perpendicular to the first parting line and the second parting line, thereby making an predetermined angle to the first parting line.

2. An optical device comprising:
   a wiring substrate;
   a sub-mount on which at least two semiconductor lasers composed of a first semiconductor laser and a second semiconductor laser are mounted in parallel with each other and in which an onboard part for mounting the first and second semiconductor lasers thereon and an optical-path conversion mirror for reflecting laser lights emitted from the first and second semiconductor lasers are integrated with each other, the sub-mount being arranged on the wiring substrate;
   a light receiving element substrate arranged on the wiring substrate; and
   a light receiving element arranged on the light receiving element substrate and divided into first and second light receiving regions by at least one parting line, wherein the sub-mount is arranged on the wiring substrate so that one light gravity center of an optical spot, which is formed on the light receiving element by homeward flux of light emitted from the first semiconductor laser and reflected by an optical disc, and another light gravity center of an optical spot, which is formed on the light receiving element by homeward flux of light emitted from the second semiconductor laser and reflected by the optical disc, are together positioned on the parting line.

3. An optical device comprising:

a wiring substrate;

a sub-mount on which at least two semiconductor lasers composed of a first semiconductor laser and a second semiconductor laser are mounted in parallel with each other and in which an onboard part for mounting the first and second semiconductor lasers thereon and an optical-path conversion mirror for reflecting laser lights emitted from the first and second semiconductor lasers are integrated with each other, the sub-mount being arranged on the wiring substrate;

a light receiving element substrate arranged on the wiring substrate; and a light receiving element arranged on the light receiving element substrate and divided into first and second light receiving regions by at least one parting line, wherein a first apparent luminous point of the first semiconductor laser by the optical-path conversion mirror is arranged in a position so that a calculated output of a difference between respective outputs generated from the first and second light receiving regions both receiving homeward flux of light emitted from the first semiconductor laser and reflected by an optical disc, becomes equal to zero, and assuming that "d" represents an interval between respective luminous points of the first and second semiconductor lasers, the sub-mount is arranged on the wiring substrate so that its longitudinal axis is inclined to a direction parallel to a top surface of the light receiving element substrate and perpendicular to the parting line by an angle $\theta$, and that $\Delta Y$ represents a difference in height between the first apparent luminous point and a second apparent luminous point of the second semiconductor laser by the optical-path conversion mirror, there is established a relationship of $\Delta Y = -d \sin \theta$, whereby a calculated output of a difference between respective outputs generated from the first and second light receiving regions both receiving homeward flux of light emitted from the second semiconductor laser and reflected by an optical disc, becomes equal to zero.

* * * * *